(12) United States Patent
Siomina et al.

(10) Patent No.: US 8,873,408 B2
(45) Date of Patent: Oct. 28, 2014

(54) METHODS AND APPARATUS FOR ENHANCING NETWORK TESTING PROCEDURES

(75) Inventors: Iana Siomina, Solna (SE); Torbjörn Wigren, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 436 days.

(21) Appl. No.: 13/147,196

(22) PCT Filed: Jun. 27, 2011

(86) PCT No.: PCT/SE2011/050847
§ 371 (c)(1),
(2), (4) Date: Aug. 18, 2011

(87) PCT Pub. No.: WO2012/060761
PCT Pub. Date: May 10, 2012

(65) Prior Publication Data
US 2012/0113837 A1    May 10, 2012

Related U.S. Application Data

(60) Provisional application No. 61/410,292, filed on Nov. 4, 2010.

(51) Int. Cl.
| | | |
|---|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 12/26* | (2006.01) |
| *H04W 4/00* | (2009.01) |
| *H04B 7/216* | (2006.01) |
| *H04J 3/16* | (2006.01) |
| *H04J 3/22* | (2006.01) |
| *H04W 24/10* | (2009.01) |
| *H04W 64/00* | (2009.01) |

(52) U.S. Cl.
CPC .................................. *H04W 24/10* (2013.01); *H04W 64/00* (2013.01)
USPC ........... 370/252; 370/328; 370/329; 370/335; 370/465

(58) Field of Classification Search
None
See application file for complete search history.

(56) References Cited

U.S. PATENT DOCUMENTS

| 5,130,936 A * | 7/1992 | Sheppard et al. ............. 702/123 |
| 2005/0026626 A1 | 2/2005 | Carl et al. |

(Continued)

FOREIGN PATENT DOCUMENTS

| WO | 2009/096839 A1 | 8/2009 |
| WO | 2012/063094 A1 | 5/2012 |

OTHER PUBLICATIONS

PCT International Search Report, mailed Oct. 10, 2011, in connection with International Application No. PCT/SE2011/050847.
PCT Written Opinion, mailed Oct. 10, 2011, in connection with International Application No. PCT/SE2011/050847.
3GPP Technical Report 36.805, V9.0.0, Technical Specification Group Radio Access Network; Study on Minimization of drive-tests in Next Generation Networks; (Release 9), Dec. 2009.

(Continued)

*Primary Examiner* — Faruk Hamza
*Assistant Examiner* — Diane Lo
(74) *Attorney, Agent, or Firm* — Patent Portfolio Builders PLLC

(57) ABSTRACT

Methods and arrangements for reporting of measurements in a wireless communication system are disclosed. The embodiments relate to methods and arrangements exercising automated collection of network performance statistics as an alternative to drive tests and reporting function called Minimizing Drive Tests (MDT). The described embodiments for reporting of measurements in a wireless communication system include acquiring suitable confidence information.

44 Claims, 3 Drawing Sheets

(56) References Cited

U.S. PATENT DOCUMENTS

| | | |
|---|---|---|
| 2005/0148340 A1 | 7/2005 | Guyot |
| 2006/0258369 A1* | 11/2006 | Burroughs et al. ........ 455/456.1 |
| 2007/0213074 A1* | 9/2007 | Fitch et al. ................ 455/456.2 |
| 2008/0125982 A1* | 5/2008 | Yoshihiro et al. ............... 702/53 |
| 2010/0039315 A1* | 2/2010 | Malkos et al. ............. 342/357.1 |
| 2010/0302954 A1* | 12/2010 | Tirpak et al. .................. 370/252 |
| 2010/0311437 A1* | 12/2010 | Palanki et al. ............. 455/456.1 |
| 2010/0323631 A1* | 12/2010 | Martin et al. .............. 455/67.11 |
| 2011/0117924 A1* | 5/2011 | Brunner et al. ........... 455/456.1 |
| 2011/0176499 A1 | 7/2011 | Siomina |
| 2013/0065535 A1* | 3/2013 | Zhou et al. ................ 455/67.11 |

OTHER PUBLICATIONS

3GPP Technical Specification 23.032, V9.0.0, Technical Specification Group Services and System Aspects; Universal Geographical Area Description (GAD); (Release 9), Dec. 2009.

3GPP Technical Specification 36.331, V8.8.0, Technical Specification Group Radio Access Network; Evolved Universal Terrestrial Radio Access (E-UTRA) Radio Resource Control (RRC); Protocol Specification; (Release 8), Dec. 2009.

3GPP Technical Specification 25.331, V8.9.0, Technical Specification Group Radio Access Network; Radio Resource Control (RRC); Protocol Specification; (Release 8); Dec. 2009.

\* cited by examiner

METHODS AND APPARATUS FOR ENHANCING NETWORK TESTING PROCEDURES

TECHNICAL FIELD

The present disclosure relates to wireless communication networks and in particular to networks exercising automated collection of network performance statistics as an alternative to drive tests. Arrangements and methods for reporting of measurements in a wireless communication system exercising automated collection of network performance statistics are disclosed.

BACKGROUND

Minimization of drive tests (MDT) is a means to compensate or partially replace the costly drive tests a network (NW) operator will otherwise have to perform by configuring a selection of user equipments (UEs) in Active/Idle modes to do certain types of measurements, such as those described in 3GPP Technical Report (TR) 36.805 v9.0.0, Study on Minimization of Drive-Tests in Next Generation Networks (Release 9) (December 2009). A UE can be selected based on its International Mobile Subscriber Identity (IMSI), International Mobile Equipment Identity (IMEI), area, device capabilities, and any combination thereof. The functionality is being standardized for LTE (Long-Term Evolution) and UMTS (Universal Mobile Telecommunications System) networks.

Use cases for MDT include coverage optimization, mobility optimization, capacity optimization, parameterization for common channels, and Quality of Service (QoS) verification. For coverage optimization by MDT, a UE can periodically measure downlink pilot signal levels (e.g., Common Pilot Channel (CPICH) Received Signal Code Power (RSCP), Common Pilot Channel Energy per chip to Noise ratio (CPICH Ec/No), or Time Division Duplexing (TDD) Primary Common Control Physical Channel (P-CCPCH) Received Signal Code Power (RSCP) and Interference Signal Code Power (ISCP), Reference Signal Received Power (RSRP) and Reference Signal Received Quality (RSRQ)), determine whether its serving cell signal level has become worse than a threshold, determine whether its transmit power headroom is less than a threshold, determine whether it has a Paging Channel failure (e.g., a Paging Control Channel (PCCH) decode error) or a Broadcast Channel failure.

Two modes of MDT are currently considered: immediate MDT and logged, or deferred, MDT. In immediate MDT, a UE in a Connected-mode state performs measurements and immediately reports those measurements to an evolved NodeB (eNodeB, or eNB) in an LTE network or a radio network controller (RNC) in a UTRAN that is available at the time of the report. In logged MDT, a UE in Idle mode performs measurements when predetermined conditions are satisfied and stores the measurements in a log for reporting to a radio node such as eNodeB in LTE and RNC in UMTS at a later point in time. The stored measurements are reported either periodically or upon a trigger, and the measurements can be single-shot (one-time) measurements or an average of measurements over a specified period. Logging and reporting intervals are typically on the order of seconds.

A UE has either zero or one radio resource control (RRC) connection to an eNB in an LTE network or to a base station (BS) and RNC in a UTRAN. A UE having an active communication with the network is typically in a Connected-mode state, whilst UEs not having transmissions to the network may be in the IDLE mode. In an LTE network, the only Connected-mode state currently specified is denoted RRC_CONNECTED, and in a UTRAN, the Connected-mode states currently specified are denoted CELL_PCH, URA_PCH, CELL_FACH and CELL_DCH. 3GPP Technical Specification (TS) 36.331 v8.8.0, Radio Resource Control (RRC), Protocol Specification (Release 8) (December 2009) specifies the RRC protocol for the radio interface between a UE and eNBs in LTE and other communication networks. 3GPP TS 25.331 v8.9.0 specifies the RRC protocol for the radio interface between a UE and BSs and RNCs in UTRANs.

In 3GPP Release 10 (Rel-10) specifications, MDT for a UE in a CONNECTED mode state is based entirely on currently specified radio measurements. For logged MDT, the UE stores (for up to 48 hours) its measurements in one or more measurement logs, and a measurement in an MDT log is linked to a time stamp that is available in the UE. Upon a UE indication transmission to the network (i.e. when the UE is ready), the network may request the UE to report the measurement logs. Based on the report, the NW operator has the opportunity, for example, to identify potential coverage problems in order to reduce costs for network deployment and operation.

One of the requirements for MDT according to 3GPP TR 36.805 is that the MDT measurements, whether immediate or logged, are time-stamped and may also be linked to "available" location information and/or other information or measurements that can be used to derive location information. 3GPP TR 36.805 currently specifies only RSRP measurements for that purpose. Reporting the location information associated with MDT measurements is optional and subject to its availability, which is relevant in particular for the IDLE mode since most positioning methods require the UE to be in a CONNECTED mode.

Thus, a constraint that needs to be accounted for in MDT is that the availability of location information is subject to UE capability and/or UE implementation. In addition, the MDT functionality should avoid long active periods and extensive use of a UE's positioning components, because doing otherwise significantly increases the UE's power consumption, which is undesirable in typically battery-powered devices.

Logged MDT measurements that have been considered so far according to 3GPP TR 36.805 include, as noted above, downlink pilot signal measurements, determinations of whether the UE's serving cell signal level has become worse than a threshold, determinations of whether its transmit power headroom is less than a threshold, and determinations of Paging Channel failure, Broadcast Channel failure, Random Access Channel failure, and radio link failure. All of those measurements may include at least the following information: location information (e.g., the location at which the event and/or measurement took place), time information (e.g., the time at which the event and/or measurement took place), cell identification (e.g., at least the identity (ID) of the serving cell is always included), and radio environment measurements (e.g., cell measurements that are available at the event and/or average cell measurements during a certain period before and/or after the event. The cell measurements typically include RSRP and RSRQ measurements.

If global navigation satellite system (GNSS) location information is "available", the MDT location information consists of latitude and longitude (which are mandatory), altitude (which is optional, contingent on availability), velocity (which is optional, contingent on availability), and movement direction (which is optional, contingent on availability). GNSS is a generic name for satellite-based positioning systems with global coverage. Examples of GNSS systems include the U.S. Global Positioning System (GPS), the European Galileo, the Russian Glonass, and the Chinese Compass. With GNSS, a position is typically obtained by triangulation based on measurements of times of arrival of satellite signals.

It has not yet been decided when GNSS location information is considered "available" for a logged MDT measurement, e.g., the acceptable time lag between an MDT measurement and determination of the corresponding location information. If GNSS location information is not available, the UE uses radio frequency (RF) fingerprint information, which typically consists of cell IDs and RSRPs for up to six intra-frequency neighbor cells. In addition to the above, an Evolved Cell Global Identifier (ECGI) of the serving cell on which the measurement was taken is always included.

In the logged-MDT case, positioning information updates that trigger MDT measurements are expected to come mainly from standalone UE-based positioning (e.g., GPS location information), and in the immediate-MDT case, positioning information updates that can serve as triggers may come from network control-plane location services (LCS) or user-plane positioning or standalone positioning.

To further enhance the location information, it has been recently proposed to also include location uncertainty information, which may be available with a location result. When the location information follows a standardized format (e.g., when it is received from another network entity, such as a positioning server, over a standardized interface), the availability of location uncertainty information also depends on the format. Some standardized location information formats do not have information elements for location uncertainty, and formats that allow for location uncertainty information typically make the uncertainty information element optional.

Table 1 shows location reporting formats that have been standardized in 3GPP, where a format is associated with a Geographical Area Description (GAD) shape according to 3GPP TS 23.032 v9.0.0, "Universal Geographical Area Description (GAD)" Release 9 (December 2009).

TABLE 1

Position reporting formats in 3GPP

| Position reporting format | Description | Includes uncertainty | Includes confidence |
|---|---|---|---|
| Polygon | The polygon format is described by a list of 3-15 latitude, longitude corners, encoded in WGS 84 coordinates. This format may be obtained by application of cell ID positioning in LTE. | Yes | No |
| Ellipsoid arc | The ellipsoid arc is described by a center point (eNodeB antenna position), encoded as latitude, longitude in WGS 84 coordinates. Furthermore, the format contains an inner radius of the arc, a thickness of the arc as well as the offset angle (clockwise from north) and the included angle (opening angle). Together, these parameters define a circular sector, with a thickness and with left and right angles, see [1] for details. This format is, e.g., produced by cell ID + TA positioning in LTE. | Yes | Yes |
| Ellipsoid point | The ellipsoid point format is described by a center point, encoded as latitude, longitude in WGS 84 coordinates. | No | No |
| Ellipsoid point with uncertainty circle | The ellipsoid point with uncertainty circle format consists of a center point, encoded as latitude, longitude in WGS 84 coordinates, in combination with an encoded radial uncertainty radius. | Yes | No |
| Ellipsoid point with uncertainty ellipse | The ellipsoid point with uncertainty ellipse format consists of a center point, encoded as latitude, longitude in WGS 84 coordinates. The uncertainty ellipse is encoded as a semi-major axis, a semi-minor axis and an angle relative to north, counted clockwise from the semi-major axis. This format is typically produced by OTDOA and A-GPS positioning in LTE. | Yes | Yes |
| Ellipsoid point with altitude | The ellipsoid point with altitude format is encoded as an ellipsoid point, together with an encoded altitude. | No | No |
| Ellipsoid point with altitude and uncertainty ellipsoid | This is the format commonly received from A-GPS capable terminals. It consists of an ellipsoid point with altitude and an uncertainty ellipsoid, the latter encoded with a semi-major axis, a semi-minor axis, an angle relative to north, counted clockwise from the semi-major axis, together with an uncertainty altitude. This format is typically produced by A-GPS positioning in LTE. | Yes | Yes |

Two approaches to considering location uncertainty information with reported MDT measurements have been discussed: (1) including the uncertainty information as an element in reports/logs upon availability, and (2) reporting/logging MDT measurements for which (a) the uncertainty satisfies a certain acceptable uncertainty level configured by the network, or (b) the uncertainty exceeds a certain acceptable uncertainty level. Including location uncertainty information in a report or log is preferable, since it provides more flexibility for processing collected MDT measurements.

Signaling of MDT measurements, including associated location information when available, is via RRC signaling. Available MDT measurements performed for intra-frequency/inter-frequency/inter-radio access technology (inter-RAT) can be reported. The set of neighbor cell measurements and associated information that can be reported for MDT currently includes: RSRP and RSRQ for E-UTRAN; RSCP and Ec/No for UTRAN; Rxlev for a GSM and Enhanced Data Rates for GSM Evolution (EDGE) Network (GERAN); carrier frequency (for inter-frequency/inter-RAT); and physical cell ID of the logged cell.

Current approaches to handling location information and location uncertainty information suffer from a number of drawbacks. For example, location information is often erroneously treated as of unsatisfactory quality when it is not. In addition, location information is usually limited to GNSS information, or when GNSS information is not available, to RSRP fingerprints. Moreover, new uses of MDT measurements, e.g., to support network compliance with new or changed official regulations, are limited. Furthermore, UE memory and signaling resources are limited, which can limit MDT measurements or impact the quality. Further, the quality of the reported MDT measurements is currently not known to the network.

SUMMARY

The object of the present embodiments is to address some of the problems and disadvantages outlined above, and to provide improved methods and arrangements for reporting measurements in a wireless communication system.

The above stated object is achieved by means of the methods and the arrangements according to the independent claims.

In accordance with a first aspect of embodiments, a method in a radio network node for reporting of measurements in a wireless communication system is provided. The radio network node is comprised in the wireless communication system and is configured to communicate with at least one user equipment. The method comprises retrieving measurement information included in a Minimization of Drive Tests (MDT) report from the user equipment. The method further includes retrieving uncertainty information and acquiring confidence information. The method further allows for obtaining the uncertainty and confidence information upon request. In one specific example, a certain confidence level may be pre-defined or requested by the radio network node. Some examples of radio network nodes are eNodeB in LTE and RNC in UMTS.

In accordance with a second aspect of embodiments, a method in a user equipment for reporting of measurements in a wireless communication system is provided. The user equipment is configured to communicate with a radio network node comprised in the wireless communication system. The method comprises, e.g. after receiving a request from the radio network node, to report Minimization of Drive Tests (MDT) measurements. Furthermore, the method includes performing the requested MDT measurements to acquire measurement information. It also comprises obtaining the location information and confidence information of the location information which are associated with each other and both are associated with at least one of the MDT measurements. Additionally, the method includes sending said measurement information and said confidence information to the radio network node.

In accordance with a third aspect of embodiments, a radio network node for reporting of measurements in a wireless communication system is provided. The radio network node is arranged to be comprised in the wireless communication system and is configured to communicate with at least one user equipment. The radio network node comprising a processor adapted to retrieve measurement information included in a Minimization of Drive Tests (MDT) report from the user equipment. The processor is further adapted to retrieve uncertainty information and to obtain confidence information.

In accordance with a fourth aspect of embodiments, an arrangement in a user equipment for reporting of measurements in a wireless communication system is provided. The user equipment is configured to communicate with a radio network node comprised in the wireless communication system. The arrangement comprises a receiver adapted to receive a request from the radio network node to report Minimization of Drive Tests (MDT) measurements. The arrangement further comprises a processor adapted to perform the requested MDT measurements to acquire measurement information. Additionally, the processor is further adapted to acquire confidence information. The arrangement further comprises a transmitter adapted to send said measurement information and said confidence information to the radio network node.

An advantage of particular embodiments is that they provide a possibility to avoid erroneous interpretation of location uncertainty information.

An advantage of particular embodiments is that they provide a possibility to provide the location information at a certain confidence level.

A further advantage of particular embodiments is that they enhance the location information used for MDT and other services such as SON, making it possible to collect and assess measurement quality statistics (which can be very helpful in identifying network problems).

Yet a further advantage of particular embodiments is that they provide a possibility to collect positioning measurements.

Further advantages and features of embodiments will become apparent when reading the following detailed description in conjunction with the drawings.

BRIEF DESCRIPTION OF THE DRAWINGS

For a better understanding, reference is made to the following drawings and preferred embodiments.

DETAILED DESCRIPTION

Figure 1:
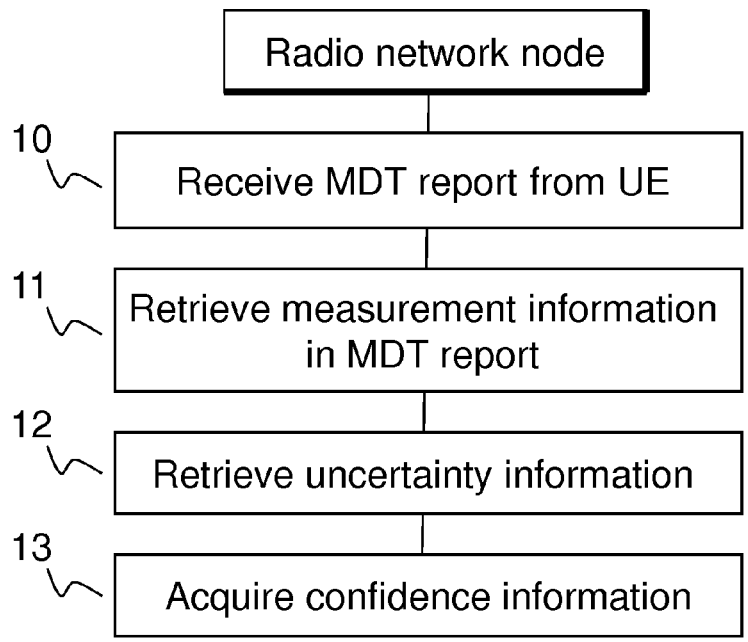
FIG. 1 is a flowchart illustrating an exemplary embodiment of a method in a radio network node for reporting of measurements in a wireless communication system.

In the following description, for purposes of explanation and not limitation, specific details are set forth, such as particular sequences of steps and particular device configurations in order to provide a thorough understanding of the embodiments. It will be apparent to one skilled in the art that the embodiments may be practiced in other embodiments that depart from these specific details. In the drawings, like reference signs refer to like elements.

Although this description is mainly written from the point of view of a user equipment (UE), it should be understood by the artisan that "UE" is a non-limiting term which means any wireless device (e.g., PDA, laptop computer, mobile phone or terminal, sensors, relays, and even small base stations, etc.). The disclosed embodiments are also not limited to LTE, e.g., the invention can also be embodied in UMTS, CDMA, WiMAX, any of IEEE 802.11 (WiFi), and any wireless network in general.

As described below, a confidence level is provided with location uncertainty information to ensure correct interpretation of the location uncertainty information and its quality. In addition, when GNSS location information is not available, non-GNSS positioning methods are used that include, for example, Observed Time Difference of Arrival (OTDOA), Uplink Time Difference of Arrival (UTDOA), Adaptive Enhanced Cell Identity (AECID), and/or Enhanced Cell Identity (E-CID). Non-GNSS location information can also be derived from any hybrid positioning method, and/or any method supporting civic address formats for positioning results. A hybrid positioning method is a positioning method that combines aspects of other positioning methods. A-GNSS may e.g. be enhanced by fusion of TA measurement information with the A-GNSS measurements of pseudo-ranges to the satellites, thereby replacing one satellite with an eNodeB position. In short, non-GNSS positioning methods that can be used in this invention include any user-plane or control-plane positioning method, any UE-based positioning method, any UE-assisted positioning method, or any network-based positioning method. In an LTE system, for example, 3GPP TS 36.300 V8.11.0, Overall Description Stage 2, (Release 8) (December 2009) describes the user plane and control plane architecture. Moreover, MDT measurements with location uncertainties and confidence levels support providing positioning accuracy information, e.g., for regulatory compliance with positioning accuracy for basic emergency services. Furthermore, constraints on the tradeoff of UE memory consumed for logging for signaling overhead are eased by including information about MDT measurement quality, which can be estimated by the UE and communicated to the network.

Apparatus and methods in accordance with the following described embodiments have one or more of the following aspects: obtaining suitable confidence information, obtain the location information associated with a certain confidence level which may be e.g. pre-defined or requested by the network in relation to the MDT measurement, extending the definition of MDT location information, including positioning-related measurements in the set of MDT measurements, and including measurement quality in MDT.

In accordance with aspects of embodiments, the MDT location information is complemented with confidence information, and support for the confidence information is enabled in the UE and the network. Suitable confidence information includes one or more of predetermined information, pre-configured information, and signaled information. The confidence information may be directly or indirectly derived information from positioning measurements or the obtained location information.

Derived information may result by analysis of results of repeated positioning results of a UE, employing statistical algorithms executed in the UE.

Predetermined information, which is already known to the UE and the network (NW), includes at least one of a value (e.g., 90% or 95%, etc.) and a set of confidence levels (e.g., (90%, 95%, 98%), (95%, 98%)) from which a value is selected according to an applicable pre-defined rule. Rules can be applied according to MDT use case, testing purpose, measurement log type, etc.

Pre-configured information, which can be set by operations and maintenance (O&M) settings or by an O&M NW node, includes at least one of information pre-configured in the NW and signaled to the UE in the messaging connected with MDT configuration and information pre-configured in the UE and optionally signaled to the NW as a part of an MDT report. MDT configuration messaging configures one or more UEs to perform desired MDT measurements, and can use broadcast, multicast, or unicast (dedicated) signaling.

Signaled information, which can be a value itself or a corresponding encoded value, includes at least one of information transmitted by the NW to a UE in the messaging connected with MDT configuration, and information transmitted from a UE to the NW, e.g., information included in an MDT report. Values can be encoded by finding a corresponding encoded value in a pre-defined mapping table, for example.

To provide the confidence information, the UE includes a functional block that manages confidence information associated with location information used for MDT. Such a functional block, which can be a suitably programmed electronic processor circuit with associated memory, manages the confidence information by at least one of obtaining the confidence information (e.g., from an MDT configuration message or from a positioning result obtained from the NW by extracting and interpreting a confidence information element in the position reporting format); maintaining the confidence information (e.g., by calculating and/or updating the confidence information based on multiple positioning reports); and transforming a location uncertainty and associated confidence level to another uncertainty and associated confidence level (e.g., to carry out an adjustment to a requested or predetermined confidence level). For example, calculating and/or updating the confidence information based on multiple positioning reports or positioning-related measurements may involve averaging the reported locations or measurement samples or positioning-related measurements which also may be reported together with MDT measurements e.g. when the location information is not available.

For a given UE, location information can be obtained in the NW, e.g., by network-based positioning methods such as those identified above, and it is within the scope of this invention that confidence information associated with a set of MDT measurements and location information may also be managed on the NW side. In other words, in addition to receiving location confidence information from a UE, a suitable NW node may also include a functional block that manages the confidence information by at least one of acquiring the confidence information (e.g., by extracting and interpreting confidence information from a NW-based positioning result associated with the UE and valid from the time/time stamp point of view, or from a positioning result obtained by other methods and stored in a network node for the given UE and valid from the time/time stamp point of view, or from UE tracking information maintained by the network and valid with respect to the time/time stamp); maintaining the confidence information (e.g., by calculating and/or updating the confidence information based on multiple positioning reports and/or location information sources); and transforming a location uncertainty and associated confidence level to another uncertainty and associated confidence level (e.g., to carry out an adjustment to a predetermined confidence level). For example, a suitable NW node may be a control-plane Location Services Node or a dedicated node connected to the control-plane Location Services Node.

In accordance with aspects of embodiments, non-GNSS location information can be used as a part of MDT location information, even when GNSS positioning information is available. This is different from current 3GPP specifications, which limit location information to GNSS information, or when that is not available, RSRP fingerprints (for up to six intra-frequency neighbor cells). The MDT location information used is determined based on a set of factors described in more detail below. Further, the UE reports an extended set of positioning-related measurements to the NW, and the extended set and the MDT measurements are used for building up AECID (Adaptive Enhanced Cell Identification) maps.

In some embodiments, the MDT location information reported by a UE can be obtained by positioning methods other than GNSS, e.g., by OTDOA, UTDOA, AECID, E-CID, any hybrid positioning method, any positioning method supporting civic address formats (which are described below), any user-plane or control-plane positioning method beyond assisted GNSS (A-GNSS), any of UE-based, UE-assisted or network-based positioning methods beyond GNSS or A-GNSS, etc. The MDT location information can then be complemented with the confidence information in one of the methods of acquiring confidence information described above.

MDT location information may be reported in a civic address format. Such a civic address format organizes civic address information identifying the physical geographical location of a network node, described with at least some of the conventional fields such as street, city, postal code, etc. An example of a civic address format is depicted in Table 2, where in practice each field typically is also associated with a short name or label. Other formats of representing the address information can, of course, be used. For multi-network compatibility, the address message format in 3GPP or 3GPP2 can also follow, for example, the format defined by the Internet Engineering Task Force (IETF), or have a conversion interface to it.

TABLE 2

Civic Address Information

| Field Description | Field Type | Field Presence (optional/mandatory) | Default value |
|---|---|---|---|
| Apartment/office/suite number/floor number | 16 alpha/numeric | Optional | No data |
| Street number | 16 alpha/numeric | Optional | No data |
| Street name | 32 alpha/numeric | Optional | No data |
| City name | 32 alpha/ numeric | Optional | No data |
| State/province name | 32 alpha/ numeric | Optional | No data |
| Postal code | 16 alpha/ numeric | Optional | No data |
| Road | 8 alpha/ numeric | Optional | No data |
| Comment (for example: "northeast corner outside Main conference room") | 64 alpha/numeric | Optional | No data |

In Table 2, at least some of the Information Elements (IEs) defining the civic address format are hierarchical, with "lower" levels of hierarchy defining location with greater specificity, and "higher" levels of hierarchy defining location more generally, or with greater uncertainty. For example, a city is a more specific location than a state; a street name is more specific than a city; a street number with the street name is more specific still; etc. In that sense, the hierarchical level of an IE in the civic address format inherently carries uncertainty information. A positioning request can be tailored to a specific level of accuracy by specifying the IEs, or the highest hierarchical level IE, to be provided. This allows applications to tailor positioning requests to the level of accuracy desired, and reduces unnecessary signalling since the full civic address (i.e., any hierarchical level higher than that requested) need not be transmitted, or propagated through the network.

Similar to other position formats, the MDT location information in a civic address format may additionally be complemented with at least one of the location uncertainty and the confidence information, where in one embodiment the uncertainty information can be represented by a polygon format (e.g., one of the GAD shapes).

In yet another embodiment, in case more than one type of location information or more than one positioning fix is available within a time interval relevant for a corresponding MDT measurement, the most accurate location information can be included in the MDT location information, where the most accurate location information is decided based on at least one of the following:
    the result of comparing at least one of the positioning measurement time, positioning fix time, and received positioning result time with the time associated with the MDT measurement (e.g., use the positioning time closest to the MDT measurement triggering time or the time when the measurement was performed);
    the location information uncertainty and confidence (if available) (e.g., use location information having location uncertainty within a given range and a confidence level above a given value, such as 90% or 95%);
    the positioning method;
    the location information type (e.g., geographical coordinates or civic address);
    the environment type (e.g., indoor/outdoor, urban/rural).

In yet other embodiments, the UE reports an extended set of positioning-related measurements. For example, the set of measurements reported in relation to the location information (e.g., when GNSS is not available) is not limited to RSRP of up to six intra-frequency cells, but is extended, including at least one of received signal quality (e.g., RSRQ in LTE), total received signal strength (e.g., Received Signal Strength Indicator (RSSI) in LTE), timing advance (TA) or time of arrival (ToA) measurements, inter-frequency measurements (any of the preceding measurements done inter-frequency), inter-RAT measurements (any of the preceding measurements done inter-RAT), and any measurement type for more than six cells (e.g., up to sixteen cells). For example, in case TA is used as MDT location information, a radial distance or range from a BS/eNB and the direction or azimuth from the BS/eNB may be combined into a region.

GNSS and fingerprint positioning measurements and the extended set of positioning measurements can be performed on a selected set of resources (e.g., downlink signal subframes), where the resources can either be obtained by the UE as part of its normal operation (e.g., measurements are performed in positioning subframes or subframes indicated to facilitate UE measurements in heterogeneous networks) or as a part of MDT configuration. Furthermore, positioning-related measurements can be included independent of whether GNSS is available or not.

In other embodiments, the positioning-related measurements (e.g., RSRP or the measurements described above) are used to enhance NW-based or UE-assisted positioning, e.g., to populate an AECID database (which are sometimes called AECID maps). Such methods can be further enhanced by including in the AECID maps the points (described, for example, by location, measurements, etc.) for which the location information meets certain uncertainty and confidence requirements, with the confidence information as described above.

In one embodiment, the environment type (e.g., indoor/outdoor, urban/suburban/rural, etc.), which may be known to the UE and which may help in analyzing MDT measurements, is included in the extended MDT location information and reported to the NW. The environment type may be signaled to the UE and is based on configured classifications in the radio access network. In another embodiment, the network relies on there being environment information available in the UE, and so the NW is configured to send requests for MDT measurements to UEs in specific environments. In this case, the specific environment information can be included in an MDT request message, and any UEs that receive the request message(s) and are in the specific environment carry out the MDT measurements accordingly.

In accordance with aspects of embodiments, positioning testing is included as a use case for MDT. Thus, positioning-related measurements can be included in the set of MDT measurements, thereby enabling MDT beyond the location information element currently specified by 3GPP. Also, one or more measurement logs and reports are generated by a UE for positioning testing and associated with corresponding positioning-related measurements. In this case, positioning-related measurements include, for example, RSRP and the measurements discussed above, e.g., TA, inter RAT RSRP, civic addresses, and timing measurements, such as time-of-arrival (ToA), UE receive-transmit (Rx-Tx) time difference, etc. UE Rx-Tx measurements are typically used for the serving cell. For example, the UE measures RSRP, ToA, etc. and reports those measurements to the network so that the network can compare the UE measurements against the network's UE-location measurement.

In accordance with aspects of embodiments, a measurement's quality or associated channel characteristic can be included with the measurement in an MDT report. The quality can be reported as at least one of a standard deviation, a variance, an uncertainty (for location, the uncertainty can reported as described above), and a confidence level (for location information as described above, and also for positioning and other measurements that can be reported as MDT measurements). A channel characteristic associated with a measurement can include, for example, an average channel quality indicator, a delay spread, or another metric that characterizes the communication channel over which the measurement was taken. A UE may have or may compute such a channel characteristic as part of its normal channel estimation. Likewise, the network may have or may compute such a channel characteristic. It will be noted that measurement quality included in MDT is not limited to a quality of UE geographical location information, but can also include a quality of any RF measurement, which need not be a positioning-related measurement.

In some embodiments, at least one of the above measurement quality characteristics and/or channel characteristics or any combination of them are used for defining requirements for measurements used for (but not limited to) MDT. For example, a UE can report a quality that is the standard deviation of a received signal strength measurement with X milliseconds (ms) and whether the reported signal strength measurement value crosses a pre-defined threshold or is within a pre-defined range. The same sort of quality can be formulated for positioning timing measurements, e.g., reference signal time difference (RSTD).

In an example scenario, the variance or standard deviation information, for example, can be useful. A Channel State Indicator (CSI) measurement (taken, for example, over one subframe) or RSSI experiencing large variation (and thus large variance and standard deviation) in a heterogeneous network where nodes with a large difference in the maximum transmit power are present, can be considered as a strong indicator for the need of configuring/reconfiguring the network, e.g., to provide low-interference subframes to better isolate transmissions from strongly interfering cells.

For another example scenario, since the period between logging/reporting MDT measurements can be relatively long (which does not necessarily mean long averaging times, but can be just measurements performed sparsely in time), the measurement quality is valuable information. Bad measurement quality can indicate at least one of a challenging environment (which is valuable information, e.g., for optimizing network configuration, self-optimized network (SON) features (radio access network (RAN) configuration information), radio resource management (RRM) and O&M), poor radio network configuration (e.g., poor antenna configuration), and poor UE performance (which can be detected, e.g., in combination with other available UE information, such as brand, model, release, etc.), for example.

Furthermore, measurements with quality values that satisfy a certain criterion (e.g., below a threshold, above a threshold, within a range, etc.) can be used for statistical processing of the measurements. That is, the quality values may themselves satisfy the certain criterion or a quality value may include an indication of whether the associated measurement value satisfies the certain criterion.

In another embodiment, only measurements for which the measurement quality satisfies a certain criterion (e.g., below a threshold, above a threshold, within a range, etc.) are reported as a part of MDT measurements. The measurement quality requirement, which comprises a certain value specified for one or a combination of the measurement quality and/or channel characteristics, can be pre-defined, pre-configured (in the UE and/or in the BS/eNB, e.g., for NW-based measurements), or signaled from the network to the UE.

FIG. 1 is a flowchart illustrating an exemplary embodiment of a method in a radio network node for reporting of measurements in a wireless communication system. The radio network node is comprised in the wireless communication system and is configured to communicate with at least one UE. In a step 11, the radio network node retrieves measurement information which is included in the MDT report sent by the at least one UE. Furthermore, the radio network node retrieves uncertainty information in step 12. The uncertainty information may be included as an element in the MDT report/log upon availability. However, the UE may only report or perform logging of MDT measurements for which (a) the uncertainty satisfies a certain acceptable uncertainty level configured by the network, or (b) the uncertainty exceeds an acceptable uncertainty level.

Further, the radio network node acquires confidence information in step 13. The acquired confidence information includes one or more of derived information, predetermined information, pre-configured information, and signaled information. Predetermined information, which is already known to the radio network node, includes at least one of a value (e.g., 90% or 95%, etc.) and a set of confidence levels (e.g., (90%, 95%, 98%), (95%, 98%), etc.) from which a value is selected according to an applicable pre-defined rule. Rules can be applied according to MDT use case, testing purpose, measurement log type, etc.

Pre-configured information, which can be set by O&M settings or by an O&M network node, includes at least one of information pre-configured in the radio network node and signaled to the UE in the messaging connected with MDT configuration and information pre-configured in the UE and optionally signaled to the radio network node as a part of an MDT report. MDT configuration messaging configures one or more UEs to perform desired MDT measurements, and can use broadcast, multicast, or unicast (dedicated) signaling.

Signaled information, which can be a value itself or a corresponding encoded value, includes at least one of information transmitted by the radio network node to the UE in the messaging connected with MDT configuration, and information transmitted from the UE to the radio network node, e.g., information included in an MDT report. Values can be encoded by finding a corresponding encoded value in a pre-defined mapping table, for example.

Uncertainty information typically comprises information regarding the variance or standard deviation of a measured or estimated quantity, or possible a complete statistical probability distribution function representing measurement outcomes of such a function. The confidence information comprises the probability that the actual value of the quantity, e.g. position or a radio measurement, has a true value that falls within the range expressed by the uncertainty information.

In a further embodiment, the uncertainty information is transformed into another uncertainty information based on the acquired confidence information. For example, a location uncertainty level may be transformed to another location uncertainty level based on the acquired associated confidence information In yet a further embodiment, the processing of MDT measurements may be distributed. The measurement information and at least one of the uncertainty information and the confidence information may then be sent 15 to another node comprised in the wireless communication system. For example, the measurement information and at least one of the uncertainty information and the confidence information may be sent to another radio network node or a centralized node comprised in the wireless communication system.

As mentioned above, the confidence information may be maintained based on multiple positioning measurements e.g., by calculating and/or updating the confidence information based on multiple positioning reports and/or location information sources.

In an exemplary embodiment, positioning measurement information is obtained by a positioning method other than GNSS, e.g., OTDOA, UTDOA, AECID, E-CID, or a hybrid positioning method or a positioning method supporting civic address formats as described above. Further, a set of positioning-related measurements may be included in the MDT report and the measurements may then be used for building up AECID maps. Consequently, the location information in the AECID map then meets certain uncertainty and confidence requirements as determined by the uncertainty information and confidence information.

In a further exemplary embodiment, the most accurate positioning measurement information of the positioning methods is included in the MDT report. The most accurate positioning measurement information is decided based on at least one of the following:
- a result of comparing at least one of a positioning measurement time, positioning fix time, and received positioning result time with a time associated with the MDT measurement (e.g., use a positioning time closest to the MDT measurement triggering time or the time when the measurement was performed);
- the location uncertainty information and confidence information;
- the positioning method;
- the location information type (e.g., geographical coordinates or civic address); and
- the environment type (e.g., indoor/outdoor, urban/rural).

Figure 2:
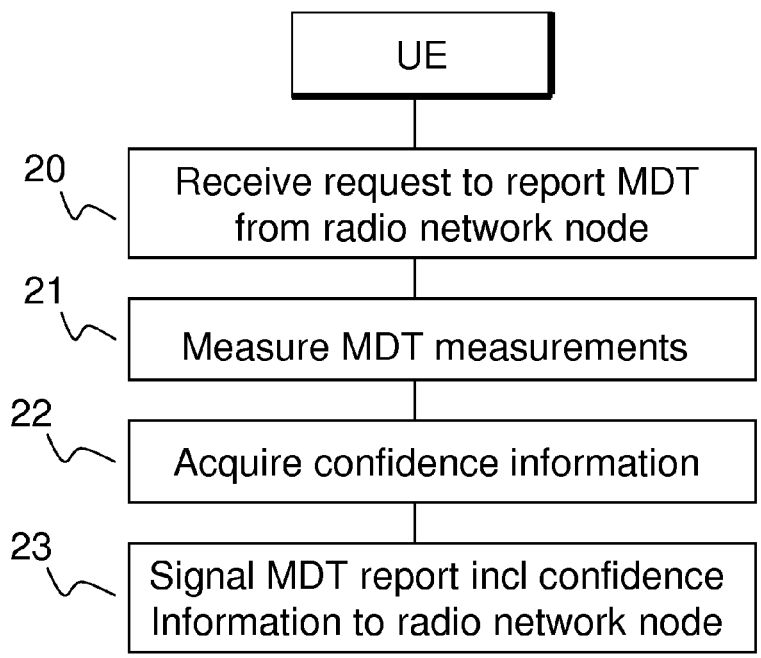
FIG. 2 is a flowchart illustrating an exemplary embodiment of a method in a user equipment for reporting of measurements in a wireless communication system.

FIG. 2 is a flowchart illustrating an exemplary embodiment of a method in a UE for reporting of measurements in a wireless communication system. The UE is configured to communicate with a radio network node comprised in the wireless communication system. In a first step 20 the UE receives a request from the radio network node to report MDT measurements. Further, the UE performs the requested MDT measurements to acquire measurement information in a next step 21. In a further step 22 the UE acquires confidence information.

The acquired confidence information includes one or more of derived information, predetermined information, pre-configured information, and signaled information. Predetermined information, which is already known to the UE, includes at least one of a value (e.g., 90% or 95%, etc.) and a set of confidence levels (e.g., (90%, 95%, 98%), (95%, 98%), etc.) from which a value is selected according to an applicable pre-defined rule. Rules can be applied according to MDT use case, testing purpose, measurement log type, etc.

Pre-configured information, which can be set by O&M settings or by an O&M network node, includes at least one of information pre-configured in the radio network node and signaled to the UE in the messaging connected with MDT configuration and information pre-configured in the UE and optionally signaled to the radio network node as a part of an MDT report. MDT configuration messaging configures one or more UEs to perform desired MDT measurements, and can use broadcast, multicast, or unicast (dedicated) signaling.

Signaled information, which can be a value itself or a corresponding encoded value, includes at least one of information transmitted by the radio network node to the UE in the messaging connected with MDT configuration, and information transmitted from the UE to the radio network node, e.g., information included in an MDT report. Values can be encoded by finding a corresponding encoded value in a pre-defined mapping table, for example.

Further, the measurement information and the confidence information are sent 23 to the radio network node.

It is noted that also in the method in the UE the confidence information may be maintained based on multiple positioning measurements e.g., by calculating and/or updating the confidence information based on multiple positioning reports and/or location information sources.

In an exemplary embodiment, positioning measurement information is obtained by a positioning method other than GNSS, e.g., OTDOA, UTDOA, AECID, E-CID, or a hybrid positioning method or a positioning method supporting civic address formats as described above. Further, a set of positioning-related measurements may be included in the MDT report and the measurements may then be used for building up AECID maps. Consequently, the location information in the AECID map then meets certain uncertainty and confidence requirements as determined by the uncertainty information and confidence information.

In a further exemplary embodiment, the most accurate positioning measurement information of the positioning methods is included in the MDT report. The most accurate positioning measurement information is decided based on at least one of the following:
- a result of comparing at least one of a positioning measurement time, positioning fix time, and received positioning result time with a time associated with the MDT measurement (e.g., use a positioning time closest to the MDT measurement triggering time or the time when the measurement was performed);
- the location uncertainty information and confidence information;

the positioning method;

the location information type (e.g., geographical coordinates or civic address); and the environment type (e.g., indoor/outdoor, urban/rural).

In an exemplary embodiment, the confidence information and uncertainty information are acquired from positioning information obtained by the UE prior sending the MDT report to the radio network node.

In yet another exemplary embodiment, the measurement information and the confidence information are sent to the radio network node together with at least one of standard deviation information and variance information and channel characteristic associated with the measurement information.

Figure 3:
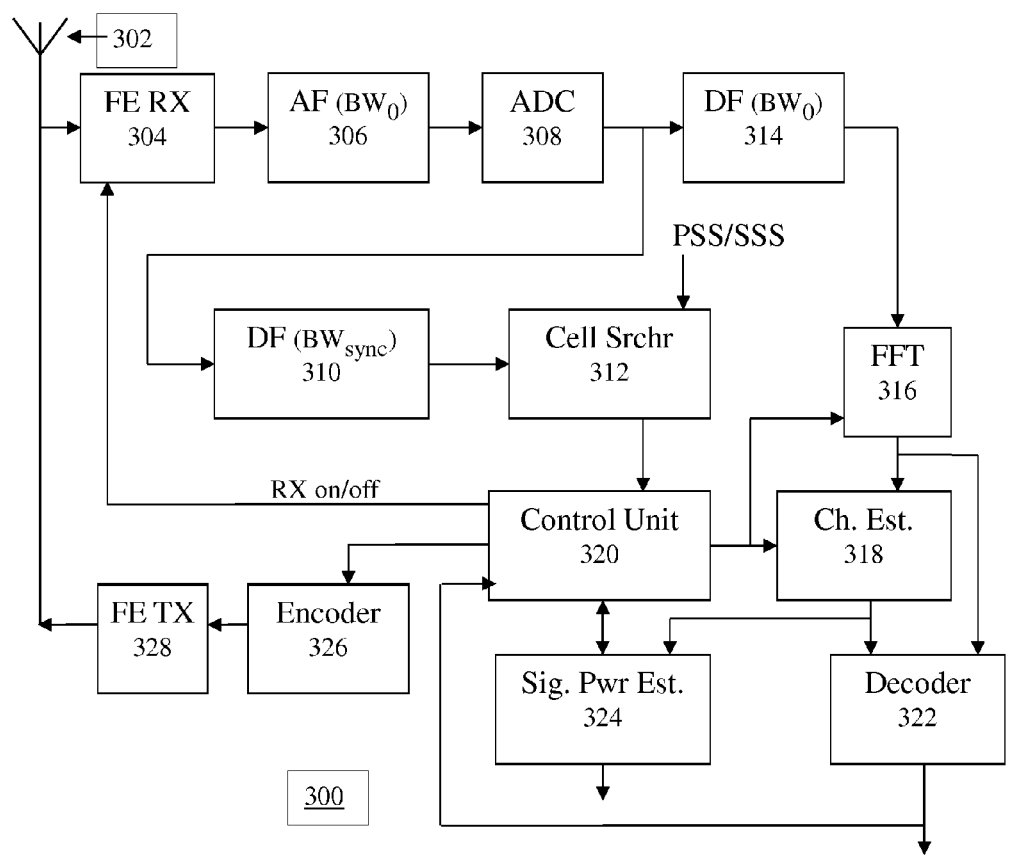
FIG. 3 is a block diagram of an arrangement in a user equipment for reporting of measurements in a wireless communication system.

FIG. 3 is a block diagram of an arrangement 300 in a UE that can implement the methods described above. It will be appreciated that the functional blocks depicted in FIG. 3 can be combined and re-arranged in a variety of equivalent ways, and that many of the functions can be performed by one or more suitably programmed digital signal processors. Moreover, connections among and information provided or exchanged by the functional blocks depicted in FIG. 3 can be altered in various ways to enable a UE to implement other methods involved in the operation of the UE.

As depicted in FIG. 3, a UE receives a downlink (DL) radio signal through an antenna 302 and typically down-converts the received radio signal to an analog baseband signal in a front end receiver (Fe RX) 304. The baseband signal is spectrally shaped by an analog filter 306 that has a bandwidth $BW_0$, and the shaped baseband signal generated by the filter 306 is converted from analog to digital form by an analog-to-digital converter (ADC) 308.

The digitized baseband signal is further spectrally shaped by a digital filter 310 that has a bandwidth $BW_{sync}$, which corresponds to the bandwidth of synchronization signals or symbols included in the DL signal. The shaped signal generated by the filter 310 is provided to a cell search unit 312 that carries out one or more methods of searching for cells as specified for the particular communication system, e.g., LTE. Typically, such methods involve detecting predetermined primary and/or secondary synchronization channel (P/S-SCH) signals in the received signal.

The digitized baseband signal is also provided by the ADC 308 to a digital filter 314 that has the bandwidth $BW_0$, and the filtered digital baseband signal is provided to a processor 316 that implements a fast Fourier transform (FFT) or other suitable algorithm that generates a frequency-domain (spectral) representation of the baseband signal. A channel estimation unit 318 receives signals from the processor 316 and generates a channel estimate $H_{i,j}$ for each of several subcarriers i and cells j based on control and timing signals provided by a control unit 320, which also provides such control and timing information to the processor 316.

The estimator 318 provides the channel estimates $H_i$ to a decoder 322 and a signal power estimation unit 324. The decoder 322, which also receives signals from the processor 316, is suitably configured to extract information from RRC or other messages as described above and typically generates signals subject to further processing in the UE (not shown). The estimator 324 generates received signal power measurements (e.g., estimates of reference signal received power (RSRP), received subcarrier power $S_i$, signal to interference ratio (SIR), etc.). The estimator 324 can generate estimates of RSRP, reference signal received quality (RSRQ), RSSI, received subcarrier power $S_i$, SIR, and other relevant measurements, in various ways in response to control signals provided by the control unit 320. Power estimates generated by the estimator 324 are typically used in further signal processing in the UE. The estimator 324 (or the searcher 312, for that matter) is configured to include a suitable signal correlator.

In the arrangement depicted in FIG. 3, the control unit 320 keeps track of substantially everything needed to configure the searcher 312, processor 316, estimation unit 318, and estimator 324. For the estimation unit 318, this includes both method and cell identity (for reference signal extraction and cell-specific scrambling of reference signals). Communication between the searcher 312 and the control unit 320 includes cell identity and, for example, cyclic prefix configuration.

The control unit 320 can determine which of several possible estimation methods is used by the estimator 318 and/or by the estimator 324 for measurements on the detected cell(s). In addition, the control unit 320, which typically can include a correlator or implement a correlator function, can receive messages and information signalled by the network and can control the on/off times of the Fe RX 304.

The control unit 320 provides appropriate information to an encoder 326, which generates modulation symbols or similar information that is provided to a transmitter front-end (FE TX) 328, which generates a transmission signal appropriate to the communication system. As depicted in FIG. 3, the transmission signal is provided to the antenna 302.

In an exemplary embodiment a UE comprises an arrangement 300 for reporting of measurements in a wireless communication system. The UE is configured to communicate with a radio network node comprised in the wireless communication system. The arrangement 300 comprises a receiver 304 which is adapted to receive a request from the radio network node to report MDT measurements. The arrangement 300 also comprises a processor adapted to perform the requested MDT measurements to acquire measurement information. The processor may be comprised in the control unit 320. The processor is further adapted to acquire confidence information in accordance with the methods described above. The arrangement 300 further comprises a transmitter 328 adapted to send the measurement information and the confidence information to the radio network node.

In further embodiments the processor is additionally adapted to maintain the confidence information based on multiple positioning measurements and may also be adapted to include a set of positioning-related measurements in the MDT report, wherein the measurements are used for building up AECID maps. The processor may also be adapted to include the most accurate positioning measurement information of the positioning methods in the MDT report.

In further embodiments the transmitter 328 is further adapted to send together with the measurement information and the confidence information at least one of standard deviation information and variance information and channel characteristic associated with the measurement information.

The control unit and other blocks of the UE can be implemented by one or more suitably programmed electronic processors, collections of logic gates, etc. that processes information stored in one or more memories. As noted above, the UE includes memory or other information storage functionality suitable for carrying out the methods and receiving and generating the signals described above in cooperation with the control unit and software executed by the control unit. For example, the memory can be used to collect MDT data under the control of the control unit and possibly other electronic processor(s) in the UE and to deliver the data to the NW according to software executed by the control unit(s) and information and/or requests received from NW. The stored information can include program instructions and data that enable the control unit to implement the methods described above. It will be appreciated that the control unit typically includes timers, etc. that facilitate its operations.

It will be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits). Many aspects of this invention are described in terms of sequences of actions that can be performed by, for example, elements of a programmable computer system. UEs embodying this invention include, for example, mobile telephones, pagers, headsets, laptop computers and other mobile terminals, and the like. Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

Figure 4:
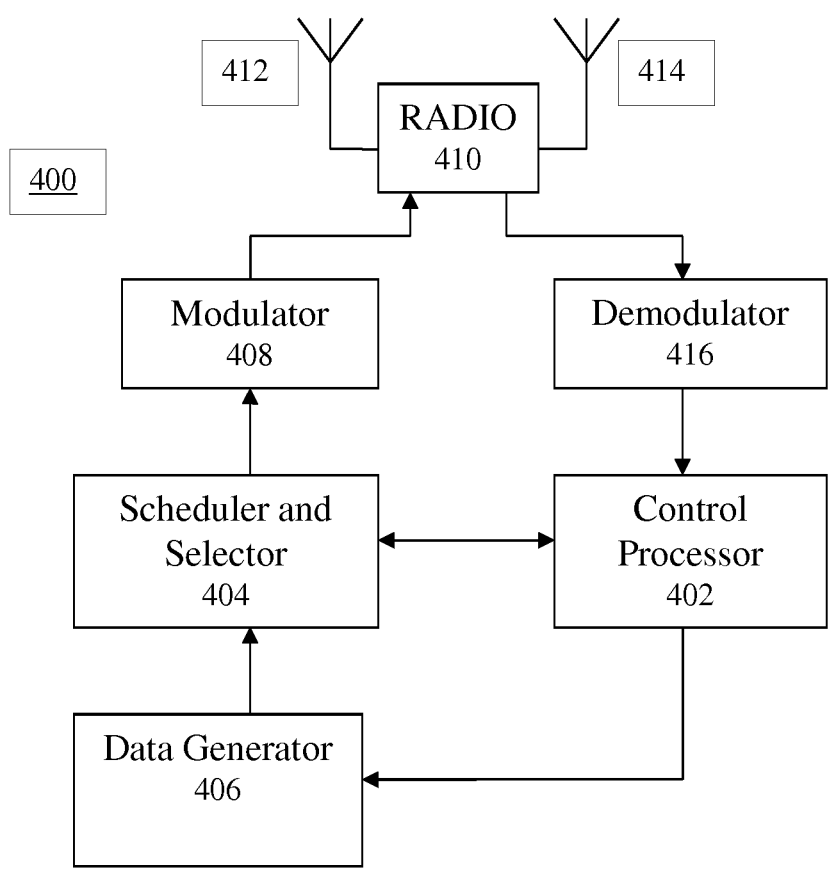
FIG. 4 is a block diagram of an arrangement in a radio network node for reporting of measurements in a wireless communication system.

FIG. 4 is a block diagram of a portion of an eNB 400, which is typical of transmitting nodes in a wireless communication network 10 can communicate with UEs by implementing the methods described above. It will be appreciated that the functional blocks depicted in FIG. 4 can be combined and re-arranged in a variety of equivalent ways, and that many of the functions can be performed by one or more suitably programmed digital signal processors and other known electronic circuits.

The eNB 400 is operated by a control processor 402, which typically and advantageously is a suitably programmed digital signal processor. The control processor 402 typically provides and receives control and other signals from various devices in the eNB 400. For simplicity in FIG. 4, the control processor 402 is shown exchanging information with a scheduler and selector 404, which receives digital words to be transmitted to respective UEs or to be broadcast from a suitable data generator 406. The scheduler and selector 404 implements resource block and resource element (RB/RE) scheduling and selection in an LTE system, for example, and implements code allocation, for example, in other communication systems.

The control processor 402 can be configured to monitor the load on the eNB, which can be determined for example simply by counting the resource blocks (RBs) and resource elements (REs) to be transmitted in a subframe, frame, or group of them. A processor such as the control processor 402 can also be configured as a traffic analyzer that determines the load on a BS by monitoring the BS buffer status, e.g., how much data is waiting for available bandwidth to be transmitted to all connected UEs in relation to the number of RBs and REs being and recently transmitted. The processor 402 is suitably configured to implement other steps of methods described above.

Information from the scheduler and selector 404 is provided to a modulator 408 that uses the information to generate a modulation signal suitable for the particular communication system. For example, the modulator 408 in an LTE system is an orthogonal frequency division multiplex (OFDM) modulator. The modulation signal generated by the modulator 408 is provided to a suitable radio circuit 410 that generates a wireless signal that is transmitted through at least one transmit antenna 412. Wireless signals transmitted by UEs are captured by at least one receive antenna 414 that provides those signals to the radio 410 and a demodulator 416. The artisan will understand that the same antenna can be used for transmission and reception, as is often done in a UE.

It will be understood that the control processor 402 can be configured such that it includes one or more other devices depicted in FIG. 4, which can be implemented by dedicated programmed processors or other suitable logic configured to perform their functions. The combination of the data generator 406, scheduler and selector 404, and modulator 408 produces DL frames or sub-frames to be transmitted. The modulator 408 converts the information into modulation symbols that are provided to the radio 410, which impresses the modulation symbols on one or more suitable carrier signals. In an LTE system for example, the radio 410 impresses the modulation symbols on a number of OFDM subcarriers. The modulated subcarrier signals are transmitted through the antenna 412.

In an exemplary embodiment the radio network node 400 is suitable for reporting of measurements in a wireless communication system. The radio network node 400 is arranged to be comprised in the wireless communication system and is configured to communicate with at least one UE. The radio network node 400 comprises a processor 402 which is adapted to retrieve measurement information included in a MDT report from the UE. The processor 402 is further adapted to retrieve uncertainty information and to acquire confidence information in accordance with the methods described above.

In further embodiments the processor 402 is additionally adapted to transform the uncertainty information into another uncertainty information based on the confidence information.

In an exemplary embodiment the radio network node 400 includes a transceiver. The transceiver may be comprised in the radio circuit 410 and/or the at least one transmit antenna 412 and/or the at least one receive antenna 414 depicted in FIG. 4. The transceiver may be adapted to send the measurement information and at least one of the uncertainty information and the confidence information to a node comprised in the wireless communication system as the processing of MDT measurements may be distributed. It may also be adapted to receive the confidence information from another node comprised in the wireless communication system.

In further embodiments the processor 402 may be adapted to maintain the confidence information based on multiple positioning measurements. Additionally, it may be adapted to include a set of positioning-related measurements in the MDT report, wherein the measurements are used for building up AECID maps. Furthermore, it may also be adapted to include the most accurate positioning measurement information of the positioning methods in the MDT report.

It will be appreciated that many of the several blocks of the devices depicted in the figures can be implemented by one or more suitably programmed electronic processor circuits, collections of logic gates, etc. that process information stored in one or more memories. The stored information can include program instructions and data that enable the blocks to implement the methods described above. It will be appreciated that the devices typically include timers, etc. that facilitate their operations.

It will also be appreciated that procedures described above are carried out repetitively as necessary, for example, to respond to the time-varying nature of communication channels between transmitters and receivers. The methods and devices described above can be combined and re-arranged in a variety of equivalent ways, and the methods can be performed by one or more suitably programmed or configured digital signal processor circuits and other known electronic circuits (e.g., discrete logic gates interconnected to perform a specialized function, or application-specific integrated circuits). Many aspects of this invention are described in terms of sequences of actions that can be performed by, for example, elements of a programmable computer system. Devices embodying this invention include, for example, mobile telephones, pagers, headsets, laptop computers and other mobile terminals, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

The embodiments may, of course, be carried out in other ways than those specifically set forth herein without departing from essential characteristics of the embodiments described. The present embodiments are to be considered in all respects as illustrative and not restrictive.

ABBREVIATIONS

3GPP 3$^{rd}$ Generation Partnership Project
AECID Adaptive Enhanced Cell Identity
BS Base Station
CRS Cell-specific Reference Signal
E-CID Enhanced Cell Identity
eNB evolved Node B, or eNodeB
E-SMLC Evolved Serving Mobile Location Center
GAD Geographical Area Description
GNSS Global Navigation Satellite Systems
LCS Location Services
LTE Long-Term Evolution
MDT Minimization of Drive Tests
NW Network
O&M Operation and Maintenance
OTDOA Observed Time Difference of Arrival
PCI Physical Cell Identity
RAN Radio Access Network
RAT Radio Access Technology
RF Radio Frequency
RNC Radio Network Controller
RRC Radio Resource Control
RRM Radio Resource Management
RSRP Reference Signal Received Power
RSRQ Reference Signal Received Quality
RSSI Received Signal Strength Indicator
Rx-Tx Reception-Transmission
SFN System Frame Number
SINR Signal-to-Interference and Noise Ratio
SON Self Optimized Network
UE User Equipment
UMTS Universal Mobile Telecommunications System
UTDOA Uplink Time Difference of Arrival

The invention claimed is:

1. A method in a radio network node of reporting measurements in a wireless communication system, the radio network node being included in the wireless communication system and configured to communicate with at least one user equipment, the method comprising:
   retrieving measurement information included in a Minimization of Drive Tests (MDT) report;
   retrieving uncertainty information;
   acquiring confidence information;
   transforming the uncertainty information into another uncertainty information based on the confidence information for adjusting to a requested or predetermined confidence level; and
   sending the measurement information and at least one of the uncertainty information and the confidence information to a node included in the wireless communication system.

2. The method of claim 1, wherein the measurement information relates to positioning measurement information, and the method further comprises maintaining the confidence information based on multiple positioning measurements.

3. The method of claim 2, wherein the positioning measurement information is obtained by an Observed Time Difference of Arrival (OTDOA) positioning method, an Uplink Time Difference of Arrival (UTDOA) positioning method, an Adaptive Enhanced Cell Identity (AECID) positioning method, an Enhanced Cell Identity (E-CID) positioning method, a hybrid positioning method, or a positioning method supporting civic address formats.

4. The method of claim 3, further comprising including a set of positioning-related measurements in the MDT report, wherein the measurements enable building up AECID maps.

5. The method of claim 3, further comprising including a most accurate positioning measurement information of the positioning methods in the MDT report.

6. The method of claim 1, wherein the confidence information is pre-determined.

7. The method of claim 6, wherein the confidence information is a value or a set of confidence levels from which one value is selected according to a pre-defined rule.

8. The method of claim 1, wherein the confidence information is received from the user equipment in the MDT report.

9. The method of claim 1, wherein the confidence information is signaled to the user equipment.

10. The method of claim 1, wherein the confidence information is pre-configured.

11. The method of claim 1, further comprising receiving the confidence information from another node included in the wireless communication system.

12. A method in a user equipment of reporting measurements in a wireless communication system, the user equipment being configured to communicate with a radio network node included in the wireless communication system, the method comprising:
   receiving a request from the radio network node to report Minimization of Drive Tests (MDT) measurements;
   performing requested MDT measurements to acquire measurement information;
   acquiring confidence information for transforming uncertainty information into another uncertainty information based on the confidence information to adjust the confidence information to a requested or predetermined confidence level; and
   sending the measurement information associated with the confidence information to the radio network node.

13. The method of claim 12, wherein the measurement information relates to positioning measurement information, and the method further comprises maintaining the confidence information based on multiple positioning measurements.

14. The method of claim 13, wherein the positioning measurement information is obtained by an Observed Time Difference of Arrival (OTDOA) positioning method, an Uplink Time Difference of Arrival (UTDOA) positioning method, an Adaptive Enhanced Cell Identity (AECID) positioning method, an Enhanced Cell Identity (E-CID) positioning method, a hybrid positioning method, or a positioning method supporting civic address formats.

15. The method of claim 14, further comprising including a set of positioning-related measurements in the MDT report, wherein the measurements enable building up AECID maps.

16. The method of claim 14, further comprising including a most accurate positioning measurement information of the positioning methods in the MDT report.

17. The method of claim 12, wherein the confidence information is pre-determined.

18. The method of claim 17, wherein the confidence information is a value or a set of confidence levels from which one value is selected according to a pre-defined rule.

19. The method of claim 12, wherein the confidence information is received from the radio network node as part of a configuration of the MDT.

20. The method of claim 12, wherein the confidence information is pre-configured.

21. The method of claim 20, wherein the confidence information and uncertainty information are acquired from positioning information obtained by the user equipment prior to sending the MDT report.

22. The method of claim 12, further comprising sending, with the measurement information and the confidence information, at least one of standard deviation information and variance information and channel characteristic associated with the measurement information.

23. A radio network node for reporting measurements in a wireless communication system, the radio network node being arranged to be included in the wireless communication system and to communicate with at least one user equipment, the radio network node comprising:
a processor adapted to retrieve measurement information included in a Minimization of Drive Tests (MDT) report from the user equipment, to retrieve uncertainty information, to acquire confidence information, and to transform the uncertainty information into another uncertainty information based on the confidence information for adjusting to a requested or predetermined confidence level; and
a transceiver adapted to send the measurement information and at least one of the uncertainty information and the confidence information to a node included in the wireless communication system.

24. The radio network node of claim 23, wherein the measurement information relates to positioning measurement information, and the processor is further adapted to maintain the confidence information based on multiple positioning measurements.

25. The radio network node of claim 24, wherein the positioning measurement information is obtained by an Observed Time Difference of Arrival (OTDOA) positioning method, an Uplink Time Difference of Arrival (UTDOA) positioning method, an Adaptive Enhanced Cell Identity (AECID) positioning method, an Enhanced Cell Identity (E-CID) positioning method, a hybrid positioning method, or a positioning method supporting civic address formats.

26. The radio network node of claim 25, wherein the processor is further adapted to include a set of positioning-related measurements in the MDT report, wherein the measurements enable building up AECID maps.

27. The radio network node of claim 25, wherein the processor is further adapted to include a most accurate positioning measurement information of the positioning methods in the MDT report.

28. The radio network node of claim 23, wherein the confidence information is pre-determined.

29. The radio network node of claim 28, wherein the confidence information is a value or a set of confidence levels from which one value is selected according to a pre-defined rule.

30. The radio network node of claim 23, wherein the confidence information is received from the user equipment in the MDT report.

31. The radio network node of claim 23, wherein the confidence information is signaled to the user equipment.

32. The radio network node of claim 23, wherein the confidence information is pre-configured.

33. The radio network node of claim 23, wherein the transceiver is adapted to receive the confidence information from another node included in the wireless communication system.

34. An arrangement in a user equipment for reporting measurements in a wireless communication system, the user equipment being configured to communicate with a radio network node in the wireless communication system, the arrangement comprising:
a receiver adapted to receive a request from the radio network node to report Minimization of Drive Tests (MDT) measurements;
a processor adapted to perform requested MDT measurements to acquire measurement information and to acquire confidence information for transforming uncertainty information into another uncertainty information based on the confidence information to adjust the confidence information to a requested or predetermined confidence level; and
a transmitter adapted to send the measurement information and the confidence information to the radio network node.

35. The arrangement of claim 34, wherein the measurement information relates to positioning measurement information, and the processor is further adapted to maintain the confidence information based on multiple positioning measurements.

36. The arrangement of claim 35, wherein the positioning measurement information is obtained by an Observed Time Difference of Arrival (OTDOA) positioning method, an Uplink Time Difference of Arrival (UTDOA) positioning method, an Adaptive Enhanced Cell Identity (AECID) positioning method, an Enhanced Cell Identity (E-CID) positioning method, a hybrid positioning method, or a positioning method supporting civic address formats.

37. The arrangement of claim 36, wherein the processor is further adapted to include a set of positioning-related measurements in the MDT report, wherein the measurements enable building up AECID maps.

38. The arrangement of claim 36, wherein the processor is further adapted to include a most accurate positioning measurement information of the positioning methods in the MDT report.

39. The arrangement of claim 34, wherein the confidence information is pre-determined.

40. The arrangement of claim 39, wherein the confidence information is a value or a set of confidence levels from which one value is selected according to a pre-defined rule.

41. The arrangement of claim 34, wherein the confidence information is signaled from the radio network node as part of a configuration of the MDT.

42. The arrangement of claim 34, wherein the confidence information is pre-configured.

43. The arrangement of claim 42, wherein the confidence information and uncertainty information are acquired from the positioning information obtained by the user equipment prior sending the MDT report.

44. The arrangement of claim 34, wherein the transmitter is further adapted to send, with the measurement information and the confidence information, at least one of standard deviation information and variance information and channel characteristic associated with the measurement information.

* * * * *